United States Patent [19]

Deyrup

[11] Patent Number: 4,873,137
[45] Date of Patent: Oct. 10, 1989

[54] FOOD TRAY

[75] Inventor: Edward J. Deyrup, Northeast, Md.

[73] Assignee: E. I. Du Pont de Nemours and Company, Wilmington, Del.

[21] Appl. No.: 201,234

[22] Filed: Jun. 2, 1988

[51] Int. Cl.⁴ ............................................. B32B 7/02
[52] U.S. Cl. .................................. 428/216; 428/480; 428/483; 428/325
[58] Field of Search ............... 428/480, 482, 483, 325, 428/216

[56] References Cited

U.S. PATENT DOCUMENTS 4,375,494 3/1983 Stokes ................................. 428/480
4,425,457 1/1984 Christiansen et al. .............. 524/293
4,555,439 11/1985 Ueeda et al. ........................ 428/221
4,693,941 9/1987 Ostapchenko ..................... 428/480

FOREIGN PATENT DOCUMENTS 58-020636 7/1983 Japan .

Primary Examiner—George F. Lesmes
Assistant Examiner—Alisa C. Harbin

[57] ABSTRACT

A composite structure comprising at least one core layer comprising polyethylene terephthalate and at least one outer layer on each side of the core layer, comprising polyethylene terephthalate and about 10 to about 60 percent glass flake, based on the weight of the outer layer, provides thermoformed articles with good high temperature stiffness and good surface properties.

21 Claims, No Drawings

FOOD TRAY

BACKGROUND OF THE INVENTION

This invention relates to food trays and other thermoformed structures comprising a core layer with outer layers of polyethylene terephthalate reinforced by glass flakes.

Glass flakes have been used to reinforce polyethylene terephthalate (PET). U.S. Pat. No. 4,555,439, to Ueeda et al., discloses rolled sheet-like materials having superior physical properties, in particular toughness and heat resistant properties. These materials comprise 20-90% thermoplastic resin and 10-80% flaky filler. The thermoplastic resin may be PET, and the flaky filler may be glass flakes.

U.S. Pat. No. 4,425,457, to Christiansen et al., discloses a composition of 40-95% by weight PET, 4-65% by weight of a reinforcing agent, and 0.1-25% by weight of an alkali metal salt. The reinforcing agent can be glass flake. The alkali metal salt is a nucleating agent. Such compositions can be molded to produce a molded article having a smooth and glossy surface and at the same time sustaining high heat deflection temperature levels.

Japanese Pat. No. Application 58/020636 (as reported in Derwent Abstracts) discloses a plastic container obtained by mixing a thermoplastic resin (e.g. PET) with 0.1-30 wt.% of plate form glass granules. The plastic resin mixture is melted and molded into a container form by extrusion or injection blowing such that part of the thermoplastic container is stretched in at least one direction. The plastic container has excellent thermal shrinkage resistance and mechanical strength.

U.S. Pat. No. 4,693,941, to Ostapchenko discloses a process for thermoforming an article from a sheet of a composition having a crystallinity of 0-5%. The composition consists essentially of 60-77% PET, 3-10% of at least one terpolymer of ethylene, methacrylic acid, and preferably isobutyl acrylate, and 20 to 30 % of a reinforcing filler such as glass flake, with the proviso that the composition does not contain a nucleating agent. The terpolymer of ethylene has 0-100% of its carboxylic groups converted to their salt form, the cation being a divalent metal ion such as zinc. Sheets made from the compositions of this patent are said to have good thermoformability.

With the recent increase in popularity of microwave cooking, it has become common to use trays or dishes made of various plastic materials for both cooking or heating and serving of food. It is important that the plastic material used to make the dishes retains its physical properties at the relatively high temperatures encountered during the cooking process. Even more rigorous high temperature properties are demanded of materials used for dishes which are intended to be suitable for cooking in conventional ovens.

A common material of construction for such trays is crystalline polyethylene terephthalate (CPET). Trays prepared from unreinforced CPET are limited in their use because they are too flexible when removed from a hot oven. Unless such trays are supported on a metal tray, they will warp and sag under the weight of the food. This is because, although PET has a very high melting point (about 250° C.), it loses modulus around 85° C. due to the presence of a glass transition.

Mineral filled CPET compositions, including compositions filled with glass flake, have better stiffness at high temperatures, but tend to suffer from a combination of brittleness and poor color. Glass fiber reinforced compositions tend to be difficult to make and give uneven dimensions. In addition, reinforcing fillers, whether flakes or fibers, are quite expensive, and can make the cost of a reinforced tray prohibitive.

Thermoset polyesters may also be used to make food trays. But the high fabrication costs of thermoset resins make such trays commercially unattractive.

There is therefore a need for a plastic tray that is stiff at elevated temperature, can be easily produced using conventional thermoforming operations, has good color and surface smoothness, and is relatively inexpensive. It has now been found that glass flake reinforcement of at least one outer or near outer layer on each side of a core layer of such plastic trays results in a product which retains excellent stiffness when removed from a hot oven and which is easy to produce at a low cost.

SUMMARY OF THE INVENTION

The present invention provides a composite structure comprising at least one core layer comprising a thermoplastic polymeric material and at least one outer layer on each side of the core layer comprising polyethylene terephthalate and about 10 to about 60 percent glass flake, based on the weight of the outer layers, wherein the core layer comprises about 25% to about 90% of the thickness of the composite structure.

The present invention further provides this composite structure in the form of a tray.

The invention further provides a process for preparing a composite structure, comprising the steps of coextruding a core layer of a thermoplastic polymeric material and at least two outer layers of glass flake filled polyethylene terephthalate, one on either side of the core layer, to form a composite sheet, cooling the composite sheet to a temperature below the glass transition temperature of the polyethylene terephthalate, and thermoforming the composite sheet into the desired structure.

DETAILED DESCRIPTION OF THE INVENTION

The present invention includes a composite of at least three layers. One layer is a central or core layer. Its composition is not critical, and it may be prepared from any of a number of thermoplastic resins, including PET, described in more detail below. The PET used in this central layer may include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethylolethane, and pentaerythritol may be used. It is preferred that the amount of branching agent be no more than about 1 mole percent of the acid component in the polyester.

The core layer can contain a variety of other polymers such as polyethylene, and may also contain regrind material. The thickness of the core layer may be from about 0.05 to about 3.0 mm (2 to 120 mils), most preferably from about 0.4 to about 1.3 mm (15 to 50 mils).

On each side of the core is an outer layer of containing PET and glass flake, optionally with other materials. The PET is obtained by known polymerization techniques from either terephthalic acid or its lower alkyl esters (e.g., dimethyl terephthalate) and ethylene glycol. The terephthalic acid or dimethyl terephthalate is esterified or transesterified and then polycondensed with ethylene glycol to an inherent viscosity (IV) ranging from 0.5 to 0.8 dL/g as measured in a mixed solvent of 1:3 methylene chloride and trifluoroacetic acid. In order to obtain even higher molecular weight material, the polyethylene terephthalate so formed may be subjected to a solid phase polycondensation. This process is generally carried out by subjecting granulated PET to a temperature which is from 60 to 6° C. below the melting point of the polymer, either in a stream of inert gas like nitrogen or under a vacuum. By means of this treatment, inherent viscosities of greater than 1.0 dL/g can be attained. For the material of the outer layer of the present invention, PET having an inherent viscosity in the range of about 0.5 to about 0.85 dL/g is preferred.

While it is desirable to have a polymer for the outer layers which has a high melting point, it is possible to use PET which contains other comonomers, in amounts small enough not to effect substantially the high temperature properties of the PET. Typically the presence of up to about 5 mole % comonomer is acceptable. The term "PET" is intended to include such suitable copolymers. Representative comonomers include diethylene glycol, cyclohexanedimethanol, poly(ethylene glycol), glutaric acid, azelaic acid, sebacic acid, and isophthalic acid.

The second major component of the outer layers is glass flake. The composition of the glass is not limiting; "type C" glass (soda lime borosilicate glass) has been found to be suitable. Glass flakes may be present at about 10 to 60 % by weight, based on the total weight of the layer, preferably 20 to 50 % and most preferably 25 to 45 %. Suitable glass flakes include thin flakes that have been broken by impact in a hammermill and passed through a screen of a designated size. A suitable flake size, before compounding is about 0.001 mm to 0.005 mm thickness and 0.1 to 0.3 mm length of sides. The size of the glass flakes in the final article may be somewhat smaller, due to breakage during processing; flakes about 0.002 to about 0.08 mm on a side are typical.

The outer layers may also contain 0 to about 40 percent, based on the weight of the polymer components, of a low modulus polymeric material. This low modulus polymeric material is useful to improve the impact strength of the glass reinforced PET. Various low modulus ethylene copolymers useful to improve the impact strength are disclosed in U.S. Pat. Nos 4,172,859 and 3,435,093. Polyetherester, as disclosed in French Pat. No. 2,194,741,can also be used. Alternatively, the toughener can be a core-shell type material, as generally disclosed in U.S. Pat. No. 4,086,300. Core-shell materials comprising a core of poly(butyl acrylate) and a shell of a less tacky material such as polymethylmethacrylate are suitable. It is preferred to use an ethylene/carboxylic acid copolymer or an ionomer as the toughening agent. Ionomers are partially neutralized copolymers of ethylene, unsaturated carboxylic acids, and optionally other comonomers, and are described more fully in U.S. Pat. No. 3,264,272. Neutralization by divalent metal ions, particularly zinc, has been found to be particularly suitable for the purposes of this invention. Copolymers and ionomers of methacrylic acid, alkyl acrylate, and at least about 50 mole percent ethylene are most preferred.

The material of the outer layers preferably includes various stabilizers. Suitable stabilizers include hindered phenolic antioxidants and phosphite stabilizers. Examples of such stabilizers are tetrakis(methylene-3-(3,5-di-t-butyl-4-hydroxyphenyl)propionate)methane, 1,3,5-trimethyl-2,4,6-tris(3,5-di-t-butyl-4-hydroxybenzyl)benzene, and trisnonylphenyl phosphite. These may be used in concentrations from 0.05 to 1.0% based on the weight of the layer. It is particularly preferred to use a combination of stabilizers such as a phenolic and a phosphite stabilizer.

In addition, it may be useful under certain circumstances to include nonfibrous minerals fillers such as talc or $CaCO_3$ in the outer layer. The amount of these materials should preferably not exceed about 35 weight percent of the layer, in order to avoid deterioration of properties, difficulty in processing, and nonuniformity. Under certain circumstances, it may also be useful to include fibrous reinforcements such as wollastonite or other mineral fibers, or glass fibers. Similarly, the amount of fibrous reinforcement should preferably not exceed about 15 weight percent.

The thickness of the outer layer should be from about 0.04 to about 1.3 mm (1.5 to 50 mils), preferably 0.05 to 0.80 mm (2 to 30 mils), and most preferably 0.05 to 0.20 mm (2 to 8 mils).

The composites of the present invention are not particularly limited in terms of their total thickness. However, for formation of trays, plates, and the like, it is desirable that the composites be about 0.25 to about 3.0 mm (10 to 120 mils) thick, preferably about 0.5 to about 1.3 mm (20 to 50 mils). These thicknesses are suitable for many food serving applications.

Although compositions having only three layers are quite suitable, additional layers may be used if desired. For example, there can be an additional surface layer of unreinforced PET, optionally toughened as described above, overlying one or both sides of the construction. This additional surface layer will provide an even smoother surface than that obtained using only the reinforced PET layer as the outer layer. Such an additional surface layer should preferably be less than about 10 percent of the total sheet thickness. It is also permissible to include one or more barrier layers to reduce oxygen permeability. Such a layer may be present as an additional internal layer. The thickness of such a layer may ordinarily be from about 8 micrometers (0.3 mils) up to the entire thickness of the core, in which case the barrier layer may even serve as the core layer. A barrier layer may be prepared from a polymer having low oxygen permeability, such as ethylene vinyl alcohol copolymer, a polyamide, or even another polyester.

In addition to the materials mentioned above, any of the layers of the structures of the present invention may include customary amounts of traditional additives, such as antioxidants, plasticizers, colorants, etc., provided that the levels of such additives are not so high as to interfere with the advantages of the invention.

The structure is preferably made by coextrusion. The core material is delivered by one extruder and the glass flake reinforced outer layers are supplied by another extruder. The polymer forming the outer layer should be dried to less than 0.02% water content before being fed to the extruder in order to avoid hydrolysis of the polymer. The polymer forming the core material should also be dried if the volume percent PET in the core layer exceeds about 45%. The extruder temperatures should be adjusted so that the streams are molten but there is no extensive degradation. For the stream containing the glass flake, the melt temperature should exceed about 250° C. but should be less than about 330° C. As the molten composite sheet emerges from the die, it is quenched on rolls immediately adjacent to the die. The PET of the sheet will then be in a substantially amorphous state.

The sheet can be converted to a heat stable shape by any thermoforming method, such as vacuum assist, air assist, mechanical plug assist or matched mold thermoforming. Thermoforming methods such as these are well known to those skilled in the art. Examples of articles that can be prepared using thermoforming processes are containers such as bottles, jars, cans, bowls, trays, and dishes. The mold should be heated to a temperature sufficient to allow the sheet to be shaped and permit the PET to crystallize to some extent. The operable range of mold temperatures is about 120° to 215° C., with a preferred range of about 130° to 190° C.

The formed part can be stripped out of the thermoforming mold cavity by known means. Once the heat set part has been removed from the mold, the excess portion of the sheeting which remains attached to the part is trimmed away. The remainder of the material (regrind) can be reintroduced into the extruder that melts the core material. This regrind can be as much as 100 percent of the core material but would more normally be 10 to 50 percent of the core material.

While not bound by any theory, it is believed that the presence of the reinforcing glass flake selectively in the outer layers of the composite structures of the present invention is important to provide outstanding physical properties at low cost. Such selective reinforcement gives strength to precisely the parts of the composite where it is most needed. The core material, which is not so critical for stiffness, need not be reinforced, and acts as a spacer to separate the outer layers. Thus the amount of costly reinforcing glass flake is reduced.

The compositions of the present invention thus provide many advantages. Composite sheets of the material of the present invention can be thermoformed as easily as unreinforced PET sheets, and at comparable rates. The composites of the present invention are uniform, isotropic, substantially colorless, and exhibit no delamination. The composites may be used to form low cost trays which maintain stiffness even when used for cooking in a microwave or even a conventional oven. Articles made from the composites of the present invention have surprisingly smooth and uniform surfaces, despite the fact that the flake dimensions are large compared to the thickness of the layers. The articles also exhibit a surprising combination of stiffness and toughness.

EXAMPLES 1–3 AND COMPARATIVE EXAMPLE 1

The materials used for Examples 1–3 and for the Comparative Example 1 were prepared as follows. The blends used for the skin layers were prepared by combining the materials in the proportions indicated in Table I. All these materials except for the glass flake were added to the back end of a 58 mm twin screw extruder. The glass flake, if present, was fed into the front of the extruder, after the polymer had been melted. Composite sheets, 34 cm wide, of the compositions of these examples and comparative examples, were prepared by extruding the core material (also identified in Table I) on a 50.8 mm (2 inch) extruder. The skin material, when it was present, was simultaneously extruded on a 25.4 mm (1 inch) extruder. The skin and core streams were fed to a feedblock, which split the skin stream in two and produced the final three layer extrudate. Both extruders were maintained at approximately 268° C. The extruded sheet was passed between two rolls, maintained at 21° and 43° C., respectively, and then a third roll maintained at 21° C. The overall rate of extrusion was about 59 kg per hour. Compositions of the composite sheets is shown in Table II.

Sheets from examples 1–3 were very tough. They were thermoformed on a continuous lab thermoformer into food trays. These trays had good mold definition and could be readily formed. The trays exhibited uniform shrinkage and low warpage so that the desired final dimensions were obtained.

The trays prepared from examples 1–3 were loaded with three frozen potato patties and were placed in a 202° C. oven for thirty minutes. When the trays were removed they were stiff and showed very little deformation resulting from the weight of the food.

In contrast, sheets prepared from the composition of Comparative Example 1, which did not contain the glass flakes in the outer layers, were difficult to vacuum form. There was poor definition of details imparted by the mold and the trays stuck to the mold. When the trays were oven aged at 202° C for thirty minutes they severely warped.

COMPARATIVE EXAMPLE 2

An attempt was made to extrude a multiple layer structure using as the core material a blend of PET with 45% Suzorite mica 200HK, 2.2% terpolymer "a" and 0.45% of material "c," and as the outer layers, material "A" from Table I. The attempted extrusion was unsuccessful, since it was not possible to produce a uniform sheet for any length of time.

TABLE I

| Comp. | PET % | TOUGHENER % | GLASS % | ADDITIVES % |
|---|---|---|---|---|
| (Outer) | | | | |
| A | 81.6 | a, 18 | 0 | c, 0.45 |
| B | 66.1 | b, 3.8 | 30 | c, 0.095 |
| C | 66.1 | a, 3.8 | 30 | c, 0.095 |
| D | 51.9 | a, 3 | 45 | c, 0.075 |
| (Inner) | | | | |
| X | 56.8* | a, 18 | 0 | c, 0.19; d, 25 |
| Y | 100.0 | 0 | 0 | 0 | a = terpolymer of ethylene with 10 wt. % isobutyl acrylate and 10 wt. % methacrylic acid, M.I. = 35.
b = the terpolymer of (a), 36% neutralized with zinc ions.
c = "Irganox" 1010, tetrakis(methylene-3-(3,5-di-t-butyl-4-hydroxyphenyl)propionate)methane.
d = Suzorite mica, 200 HK
*0.6 I.V.
 0.85 I.V.

TABLE II*

| Ex. | Outer Layer | Glass % | Outer Layer 1 Thickness (mm) | Outer Layer 2 Thickness (mm) | Core Type | Thick (mm) |
|---|---|---|---|---|---|---|
| Comp. 1 | A | 0 | 0.10 | 0.10 | X | 0.58 |
| 1 | B | 30 | 0.23 | 0.20 | Y | 0.51 |
| 2 | C | 30 | 0.20 | 0.20 | Y | 0.43 |
| 3 | D | 45 | 0.18 | 0.18 | Y | 0.48 |

*See Table I for outer and core layer types.

I claim:

1. A rigid composite structure comprising at least one core layer comprising a thermoplastic polymeric material and at least one outer layer on each side of the core layer comprising polyethylene terephthalate and about 10 to about 60 percent glass flake, based on the weight of the outer layers, wherein the core layer comprises about 25% to about 90% of the thickness of the composite structure.

2. The composite structure of claim 1 wherein the the core layer comprises polyethylene terephthalate.

3. The composite structure of claim 1 wherein the core layer comprises a barrier resin.

4. The composite structure of claim 1 wherein the core layer also contains regrind material.

5. The composite structure of claim 1 wherein the thickness of the core layer is about 0.05 to about 3.0 mm.

6. The composite structure of claim 5 wherein the thickness of the core layer is about 0.4 to about 1.3 mm.

7. The composite structure of claim 1 wherein the polyethylene terephthalate of the outer layers contains a branching agent.

8. The composite structure of claim 1 wherein the thickness of each outer layer is from about 0.04 to about 1.3 mm.

9. The composite structure of claim 8 wherein the thickness of the outer layer is from about 0.05 to about 0.80 mm.

10. The composite structure of claim 9 wherein the thickness of the outer layer is from about 0.05 to about 0.20 mm.

11. The composite structure of claim 1 wherein the glass flake has dimensions of about 0.002 to about 0.08 mm on a side.

12. The composite structure of claim 11 wherein the glass flake is soda lime borosilicate glass.

13. The composite structure of claim 11 wherein the outer layer contains from about 20 to about 50% glass flake, based on the weight of the outer layer.

14. The composite structure of claim 13 wherein the outer layers contain from about 25 to about 45% glass flake, based on the weight of the outer layer.

15. The composite structure of claim 1 wherein the outer layers contain 0 to about 40 percent, based on the the weight of the polymer components of the outer layer, of a low modulus polymeric material.

16. The composite structure of claim 15 wherein the low modulus polymeric material is a copolymer of methacrylic acid, alkyl acrylate, and at least about 50 mole percent ethylene.

17. The composite structure of claim 16 wherein the acid groups of the copolymer are partially converted to their salt form, the cation being a divalent metal ion.

18. The composite structure of claim 17 wherein the metal ion is zinc ion.

19. A composite structure comprising at least one core layer comprising a thermoplastic polymeric material, at least one outer layer on each side of the core layer comprising polyethylene terephthalate and about 10 to about 60 percent glass flake, based on the weight of the outer layers, and at least one layer of unreinforced polyethylene terephthalate overlying at least one outer layer of glass reinforced polyethylene terephthalate, wherein the thickness of the layer of unreinforced polyethylene terephthalate is less than about 10° of the total thickness of the composite structure and wherein the core layer comprises about 25° to about 90° of the thickness of the composite structure.

20. The composite structure of claim 2 further comprising at least one layer of a polymer having low oxygen permeability.

21. The composite structure of claim 1 in the form of a tray.

* * * * *

UNITED STATES PATENT OFFICE
CERTIFICATE OF CORRECTION

PATENT NO. : 4,873,137

DATED : October 10, 1989

INVENTOR(S) : Edward J. Deyrup

It is certified that error appears in the above-identified patent and that said Letters Patent is hereby corrected as shown below:

Column 8, line 26, replace "10°" with --10%--; line 28, replace "25°" with --25%--; line 28, replace "90°" with --90%--.

Signed and Sealed this

Twenty-eighth Day of August, 1990

Attest:

HARRY F. MANBECK, JR.

*Attesting Officer*  *Commissioner of Patents and Trademarks*